US008321593B2

(12) United States Patent
Bushell et al.

(10) Patent No.: US 8,321,593 B2
(45) Date of Patent: Nov. 27, 2012

(54) TIME SYNCHRONIZATION OF MEDIA PLAYBACK IN MULTIPLE PROCESSES

(75) Inventors: John Samuel Bushell, San Jose, CA (US); Gregory R. Chapman, San Jose, CA (US); James D. Batson, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 1154 days.

(21) Appl. No.: 11/823,670

(22) Filed: Jun. 28, 2007

(65) Prior Publication Data

US 2008/0168470 A1    Jul. 10, 2008

Related U.S. Application Data

(63) Continuation-in-part of application No. 11/651,354, filed on Jan. 8, 2007, now Pat. No. 7,765,315.

(51) Int. Cl.
*G06F 15/16* (2006.01)
(52) U.S. Cl. .......................... 709/248; 718/107; 713/375
(58) Field of Classification Search .................. 709/248; 719/313; 718/107; 713/500, 375
See application file for complete search history.

(56) References Cited

U.S. PATENT DOCUMENTS

| | | | |
|---|---|---|---|
| 5,553,222 A | 9/1996 | Milne et al. | |
| 5,655,144 A | 8/1997 | Milne et al. | |
| 5,661,665 A | 8/1997 | Glass et al. | |
| 6,098,126 A | 8/2000 | Batson et al. | |
| 6,259,677 B1 | 7/2001 | Jain | |
| 6,262,776 B1 | 7/2001 | Griffits et al. | |
| 6,389,473 B1 | 5/2002 | Carmel et al. | |
| 6,429,902 B1 | 8/2002 | Har-Chen et al. | |
| 6,633,989 B1 * | 10/2003 | Hollins | 713/400 |
| 6,701,383 B1 | 3/2004 | Wallace et al. | |

(Continued)

FOREIGN PATENT DOCUMENTS

WO    WO-2006/040723 A    4/2006

OTHER PUBLICATIONS

Anonymous, "Technical Note TN2052 ChooseMovieClock and Video Output Components" Internet Article, 2002, pp. 1-5.
Chung-Ming Huang et al., "Synchronization Architectures and Control Schemes for Interactive Multimedia Presentations" vol. 42, No. 3, 1996, pp. 546-556.
Herng-Yow Chen et al., "MultiSync: A Synchronization Model for Multimedia Systems" IEEE Journal on Selected Areas in Communications, IEEE Service Center, Piscataway, US; vol. 14, No. 1, 1996, pp. 240-246.

*Primary Examiner* — Wing Chan
*Assistant Examiner* — Kostas Katsikis
(74) *Attorney, Agent, or Firm* — Kenyon & Kenyon LLP

(57) ABSTRACT

Systems, methods, devices that enable the efficient synchronization of timing information from first time-based process to a second time-based process using periodic or event-driven synchronization messages are provided. In one aspect, the invention includes a media processing system having a first process for processing media based, at least in part, on first timing information derived from a first timing source and a second timing source. The system may also include a second process for processing the media based, at least in part, on second timing information derived from the first timing source. The first process may send one or more timing synchronization messages, generated based at least in part on the first timing source and the second timing source, to the second process to synchronize the second timing information with the first timing information.

46 Claims, 10 Drawing Sheets

U.S. PATENT DOCUMENTS

| | | |
|---|---|---|
| 6,824,371 B2 | 11/2004 | Smit |
| 6,885,702 B1 | 4/2005 | Goudezeune et al. |
| 6,903,681 B2 | 6/2005 | Faris et al. |
| 7,088,774 B1 | 8/2006 | Moni et al. |
| 2001/0048728 A1* | 12/2001 | Peng ............................ 375/354 |
| 2002/0161797 A1* | 10/2002 | Gallo et al. ................ 707/500.1 |
| 2003/0177154 A1* | 9/2003 | Vrancic ........................ 708/160 |
| 2004/0252400 A1* | 12/2004 | Blank et al. ..................... 360/70 |
| 2005/0088443 A1 | 4/2005 | Blanco et al. |
| 2006/0002681 A1* | 1/2006 | Spilo et al. ...................... 386/46 |

\* cited by examiner

TIME SYNCHRONIZATION OF MEDIA PLAYBACK IN MULTIPLE PROCESSES

REFERENCE TO RELATED APPLICATIONS

This application is a continuation-in-part of U.S. patent application Ser. No. 11/651,354, filed on Jan. 8, 2007, and entitled "Time Synchronization of Multiple Time-Based Data Streams with Independent Clocks." This application is related to U.S. patent application Ser. No. 11/873,319, filed on Oct. 16, 2007, and entitled "Capturing Media in Synchronized Fashion." The above-referenced applications are incorporated herein in their entirety by reference.

BACKGROUND

This invention relates to time-based processes and data and, more specifically, to an approach for maintaining or synchronizing one or more time bases in one time-based process in relation to one or more clocks or time bases in another time-based process.

Time-based data such as video sequences, audio sequences, financial results, and laboratory data recorded over time may be represented in the metaphor of a "movie." Examples include QUICKTIME movies and movie objects from APPLE Inc. of Cupertino, Calif. Such time-based data may be consumed and played or displayed by an application or process running in a computing environment or operating system of a device or among several devices that are connected via a communications network.

A common need with regard to time-based data, such as a movie object with video, audio, and closed captioning, is that all elements of the movie need to be synchronized. For example, the audio needs to match the video, so that an actor's lips match the words that are being spoken, and the closed captioning needs to match the words being spoken. This synchronization needs to remain consistent in the event the movie data is fast forwarded, paused, reversed, or stopped and then restarted at a point existing later in the movie.

One approach to controlling timing issues in movies and synchronization of data within the movies is the use of a clock and time bases derived from the clock. In general, clock components are always moving and derive their timing information from some external source; for example, an audio clock based on a crystal timing mechanism, to provide the basic timing. Time bases describe the context of time in the currently-playing movie; for example, where the current position of the movie is compared to the entirety of the movie data. Under one approach, time bases rely on either a clock component or another time base for their time source.

Using this approach, time can be converted from one time base into a time that is relative to another time base, but only if both time bases rely on the same time source, such as a clock driven by one specific audio device. For example, in order to synchronize audio and video data, current approaches have the audio time base and video time base rooted in the audio clock. This is because while frames may be dropped from video playback or sent to a display at a higher or lower rate without perceptibly changing the viewing experience, it is more difficult to play audio faster or slower without changing the listening experience.

While the audio and video time bases are independent, it is because they are rooted in the same time source that this manipulation of the time bases is made possible. Current approaches use algebraic manipulation to derive relationships between independent time bases rooted in the same time source.

Current approaches are unable to derive accurate relationships between time bases rooted in different time sources. Therefore, under prior approaches, when there are independent audio and video clocks, synchronization is not possible. Another example is when audio is recorded into a computer, the audio data may be clocked by a crystal clock on the sound card, and not all crystal clocks run at exactly the same speed. In a system with two or more sound cards, each sound card having a clock, when recording via one sound card and playing back via another, the playback speed may be slightly different. Although both sound cards may nominally be clocking data in and out at exactly 44.1 kHz, for example, in fact they will have fractionally different sampling rates because they have fractionally different clock speeds.

This leads to problems in a system where one clock cannot be designated as the master clock; for example, synchronizing audio to an external digital timing clock. Because the external clock may not run at exactly the same speed as the clocks on the sound cards, drift between the tracks may be introduced, and because no approach exists to define accurate relationships between time bases based on disparate clocks, the drift cannot be rectified. Similar problems arise when audio is stable but one desires to synchronize audio data and video data, each with an independent time base rooted in a common clock, to an outside source, such as a MIDI sequencer. The MIDI sequencer has its own clock, and if the master device runs a little slow, the MIDI sequence tempo will drop to match it, but the audio and video may carry on at their original rates, causing the MIDI to drift relative to the audio and video.

Under certain conditions, a first application or process may utilize a clock, such as an audio clock, to control the timing of data handling while a second application or process may need to have access to information about the same audio clock in order to interact with the first process. For example, a device may employ a media playback process that interacts with a user interface (UI) process. The UI process allows a user to control the playing of media (e.g., audio and video) by the media playback process.

One problem is that the UI process may not typically have the ability to access the audio clock or a related time base and, therefore, must request audio clock or time base information continuously from the media playback process in order to synchronize the UI process with the media playback process. Such continuous remote procedure calls or requests for timing information from the media playback process can consume significant processing power that can affect system response times or result in excessive battery usage in, for example, a portable media device.

Accordingly, there is a need to enable one time-based process to synchronize media handling or processing with at least one other time-based process without the need for excessive communications between the processes that may adversely impact the performance of a media device or other media processing system.

SUMMARY

The invention, in various embodiments, addresses deficiencies in the prior art by providing systems, methods and devices that enable a first time-based process to efficiently deliver synchronization information to a second related time-based process.

In one aspect, the invention includes a media processing system having a first process for processing media based, at least in part, on first timing information derived from a first timing source. The system may also include a second process for processing the media based, at least in part, on second timing information. The first process may send one or more timing synchronization messages to the second process to synchronize the second timing information with the first timing information.

Each synchronization message may be sent periodically, in response to an event, or both periodically and in response to an event. In one configuration, the event includes the receipt, by the first process, of a media processing instruction. The media processing instruction may include an instruction of play, pause, fast forward, reverse, and stop. The media processing instruction may be delivered to the first process from a third process.

In one configuration, the synchronization message includes at least one time stamp associated with the first timing information. The timing synchronization message may include one or more time stamps derived from one or more time bases or clocks. The synchronization message may include at least one of a time stamp from a first timing source, a time stamp from a second timing source, a time stamp from a time base associated with a first process, a rate associated with the time base, and a rate scaler between the first and second timing sources. The first timing information may include information from at least one of a base clock of a first timing source and a first movie time base derived from the base clock of the first timing source.

In another configuration, the second process processes the media based, at least in part, on a second timing source. The second timing information may include at least one of a first shadow time base derived from the base clock of the first timing source and a second shadow time base derived from the first movie time base. The first timing source may include an audio clock. The second timing source may include a common reference clock.

In another aspect, a personal media device includes a processor. The processor includes a first process for processing media based, at least in part, on first timing information derived from a first timing source. The processor also includes a second process for processing the media based, at least in part, on second timing information. The first process sends one or more timing synchronization messages to the second process to synchronize the second timing information with the first timing information.

The term synchronization may refer to a direct matching of at least two timing parameters or values. Alternatively, the term synchronization may refer to a deterministic relationship between two parameters. For example, a first time base (or time source) may be synchronized with a second time base (or time source) by establishing a deterministic or algorithmic relationship between the first and second time bases.

Various advantages and applications using time synchronization between processes in accordance with principles of the present invention are discussed in more detail below.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Figure 1A:
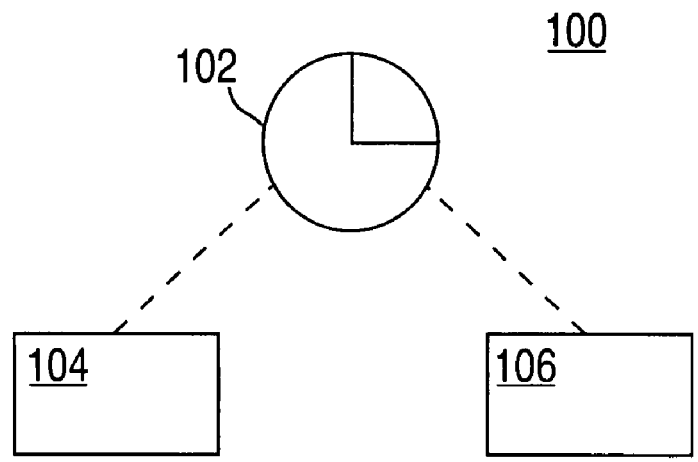
FIG. 1A is a block diagram illustrating a geometric example of a time coordinate system and a time base.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Techniques are described for synchronizing multiple time-based data streams with independent clocks wherein relationships between clock rates of timing devices associated with the time-based data streams are determined, and based on these relationships, times in at least one of the time-based data streams may be translated to times in any of the other time-based data streams despite the data streams having independent clocks.

According to an embodiment, a first relationship between a clock rate of a first timing device and a clock rate of a common reference is determined, along with a second relationship between a clock rate of a second timing device and the clock rate of the common reference. Based on the first relationship and the second relationship, a third relationship is calculated between a first set of time-based data that is based on the first timing device and a second set of time-based data that is based on the second timing device. According to an embodiment, a time stamp in a time base rooted in a first timing device may be translated to a time stamp in a time base rooted in a second timing device.

According to an embodiment, a point within a first time-based data stream that is associated with a time value generated based on a first timing device is identified, and a corresponding point in a second time-based data stream that is associated with a time value that was generated based on a second timing device that is different than the first timing device is determined, based on the difference between the clock rate of the first timing device and a third timing device, and the difference between the clock rate of the second timing device and a third timing device.

According to an embodiment, a first rate scaler between the clock rate of a first timing device and the clock rate of a common timing device is calculated along with a second rate scaler between the clock rate of a second timing device and the clock rate of a common timing device. Then, a time in a first time base running at a first rate and rooted in the first timing device is translated to a time in a second time base running at a second rate and rooted in the second timing device. In an embodiment, this step is performed by analyzing data including the first rate scaler, the second rate scaler, the time in the first time base, a pair of times each different from the time in the first time base, measured at the same time, one of the pair of times based on the first time base and the other of the pair of times based on the first timing device, the rate associated with the first time base, and the rate associated with the second time base.

According to an embodiment, consumption of a first set of video frames may be driven based on a first rate and a first set of anchor time stamp pairs, neither of which are associated with any particular time base. Consumption of a second set of video frames may be driven based on a second rate and a second set of anchor time stamp pairs, neither of which are associated with any particular time base. Then, a relationship is determined between the first set of video frames and the second set of video frames based on the difference between the clock rate of the timing device associated with the first set of anchor time stamp pairs and the clock rate of a third device, and the clock rate of the timing device associated with the second set of anchor time stamp pairs and the clock rate of a third device.

Time Clocks and Time Bases

Clocks are used in computer systems to assist in coordinating the flow of data. For example, every computer contains an internal clock that regulates the rate at which instructions are executed and synchronizes all the various computer components. This is usually an electronic device in a computer that issues a steady high-frequency signal. Other computer components, such as an audio card, may have a clock as well. These clocks are always moving during operation of the device.

A movie's time base defines the rate at which time passes for the movie, and specifies how, moment to moment, the movie's current time can be computed from the time base's time source. Time bases rely on either a clock component or another time base for their time source. The rate specifies the speed and direction in which time travels in a movie. Negative rate values reflect movement backward through a movie's data; positive values reflect forward movement. For example, when the rate is 1.0, the movie plays at its normal speed, meaning that for each second of play the movie's time advances by one second. If the rate is between 0.0 and 1.0, the movie plays in slow motion, and for each second of play the movie's time advances by less than one second. A negative rate implies that the movie is playing backward. A rate of 0 means that the movie is stopped. The time base's time source may be a clock or another time base.

According to an embodiment, a time base specifies an equation for calculating the time base's current time (t_base) based on the time source's current time (t_source) in terms of the time base's rate and an anchor moment. The anchor moment indicates a pair of times: one measured on the time base (anchor_base) and one measured on the time source (anchor_source) that occurred at the same time. According to an embodiment, one or more of these times are based on or defined by time stamp data. An example equation for determining a particular time in a time base is:

$$t\_base = ((t\_source - anchor\_source) * rate) + anchor\_base.$$

In this example, if the rate is zero, "t_base" is simply "anchor_base." "anchor_source" would be ignored and definition unnecessary.

FIG. 1A is a block diagram 100 illustrating the relationship of a time clock and related time bases. As described earlier, the time clock 102 may be a CPU system clock, an audio clock based on a crystal on an audio card or other device, a network clock, or any other type of timing device. Examples of timing devices include: interrupts based on video timing (VBL on a display; or, the house sync signal in a broadcast studio); data coming over a serial interface such as a MIDI sequencer; SMPTE timecode; timing information delivered via radio (e.g., GPS); and an atomic clock.

The time clock 102 is always moving and driven by an external measure, such as the aforementioned crystal. In FIG. 1A, two time bases 104, 106 are based on the time clock 102. As an example, one time base 104 could be the time base for video in a movie and the second time base 106 could be the time base for audio in the movie. The clock 102 could be the audio clock, as explained earlier. By having the video and audio time bases 104, 106 independent and based on the same clock 102, operations may be performed on each to maintain synchronization between the video and audio elements of the movie. For example, for a specific frame of the movie, the specific portion of audio content that relates to a video frame may be derived by algebraically evaluating each time base 104, 106.

For example, for a specific frame of the movie, the specific portion of audio content that relates to the frame may be derived algebraically, in the context of time. In the following example equations, "t_video" is the current time in the video time base, "t_audio" is the current time in the audio time base, "t_clock" is the time clock's current time, "rate_video" is the rate at which the video content is playing, and "rate_audio" is the rate at which the audio content is playing. Further, the anchor moment for the video content is indicated by two times measured at the same moment: "anchor_clock_video" is a time measured on the time clock and "anchor_video" is a time measured on the video time base. The anchor moment for the audio content is indicated by two times measured at the same moment: "anchor_clock_audio" is a time measured on the time clock and "anchor_audio" is a time measured on the audio time base. According to an embodiment, all times are measured by evaluating time stamp data.

According to an embodiment, a specific time in the video time base may be evaluated by the example equation:

$$t\_video = ((t\_clock - anchor\_clock\_video) * rate\_video) + anchor\_video$$

According to an embodiment, a specific time in the audio time base may be evaluated by the example equation:

$$t\_audio = ((t\_clock - anchor\_clock\_audio) * rate\_audio) + anchor\_audio$$

Provided that rate_video is nonzero, the video equation may be rewritten:

$$t\_clock = ((t\_video - anchor\_video) / rate\_video) + anchor\_clock\_video$$

Hence, the specific time in the audio time base that relates to the time in the video time base associated with the video frame may be derived from the following example equation:

$$t\_audio = ((((t\_video - anchor\_video)/rate\_video) + anchor\_clock\_video - anchor\_clock\_audio) * rate\_audio) + anchor\_audio.$$

Through this approach, the video controller, based on the video time base, can perform operations on what the video controller believes the local time should be, and the audio controller, based on the audio time base, can perform operations on what the audio controller believes the local time should be. A time base may have as its time source a clock or another time base.

Figure 1B:
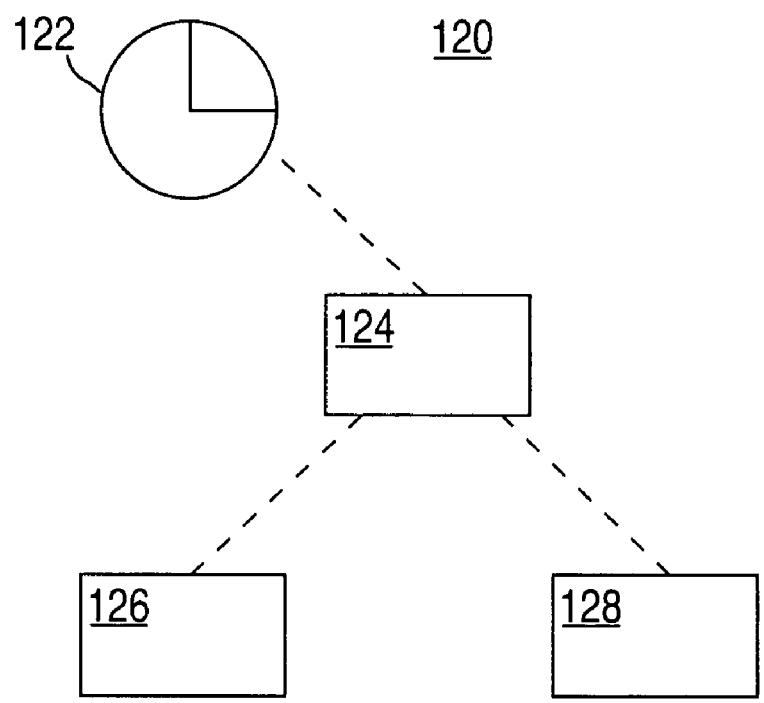
FIG. 1B is a block diagram illustrating a time base having a time base as its time source.

FIG. 1B is a block diagram 120 illustrating a time base having a time base as its time source. In FIG. 1B, two time bases 126, 128 are based on a time base 124, such as for a movie. As an example, one time base 126 could be the time base for video in the movie and the second time base 128 could be the time base for audio in the movie. The clock 122 could be the system clock. In this example, the video time base 126 and audio time base 128 of the movie could be simultaneously stopped, started, or have their rates changed by manipulating the rate of the movie time base 124.

Figure 2:
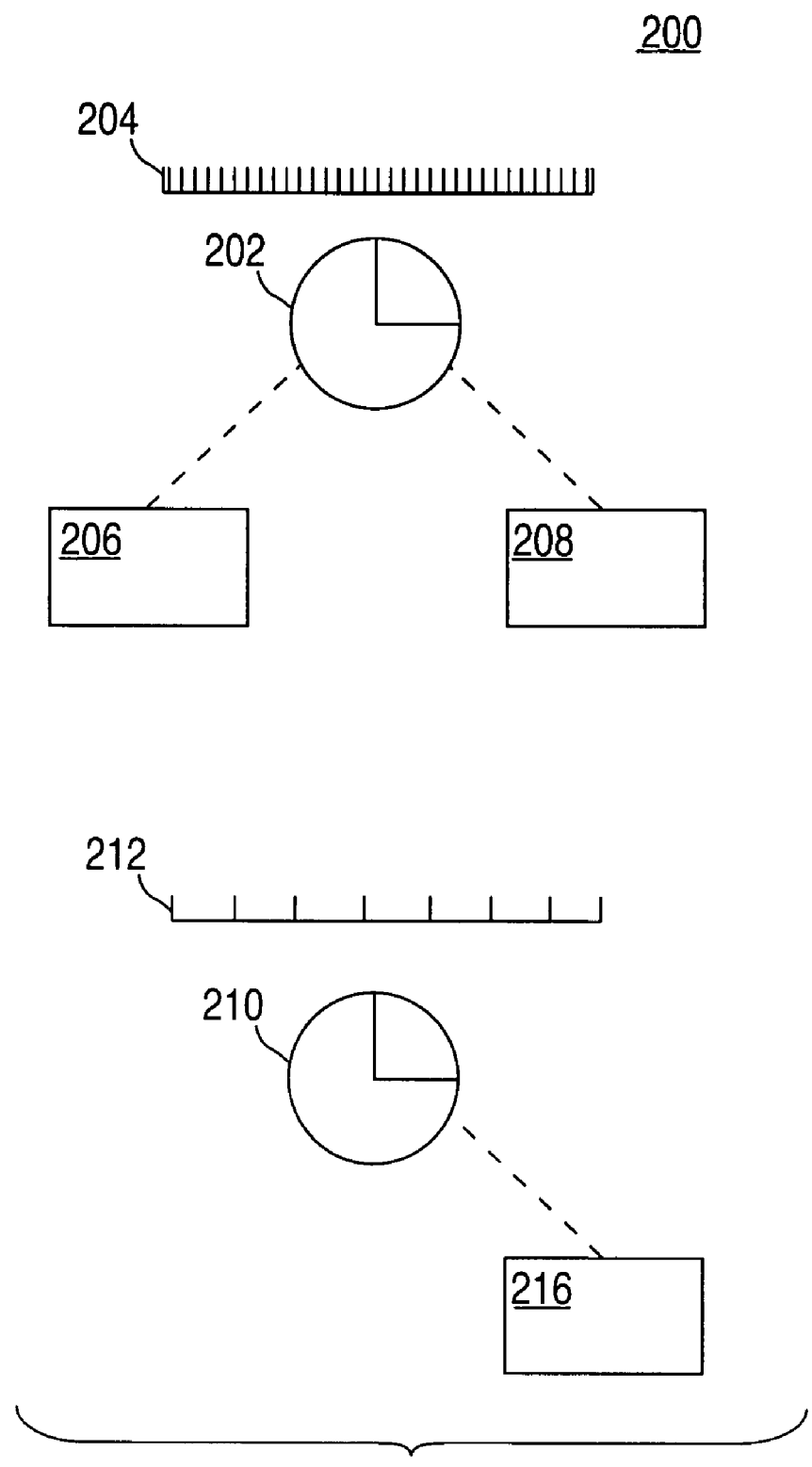
FIG. 2 is a block diagram illustrating an example of separate clocks and time bases based on the clocks.

FIG. 2 is a block diagram 200 illustrating an example of separate clocks and time bases based on the clocks. In FIG. 2, a first clock 202, such as a system clock or audio clock, has two time bases 206, 208 based upon it. The first clock 202 runs at a constant rate 204, represented in FIG. 2 by ticks on a graph 204. A second clock 210 has one time base 216 based upon it and runs at a constant rate 212, which may be different from the rate of the first clock 204. There is always a limit to the precision with which a physical device's oscillation frequency can be engineered, and cost reasons may lead to the building of devices with less precision. Some devices change their frequency as the temperature changes. While approaches exist to make one device's frequency follow another's, if no such approach is used, the devices' frequencies will be independent and they must be expected to drift.

Figure 3:
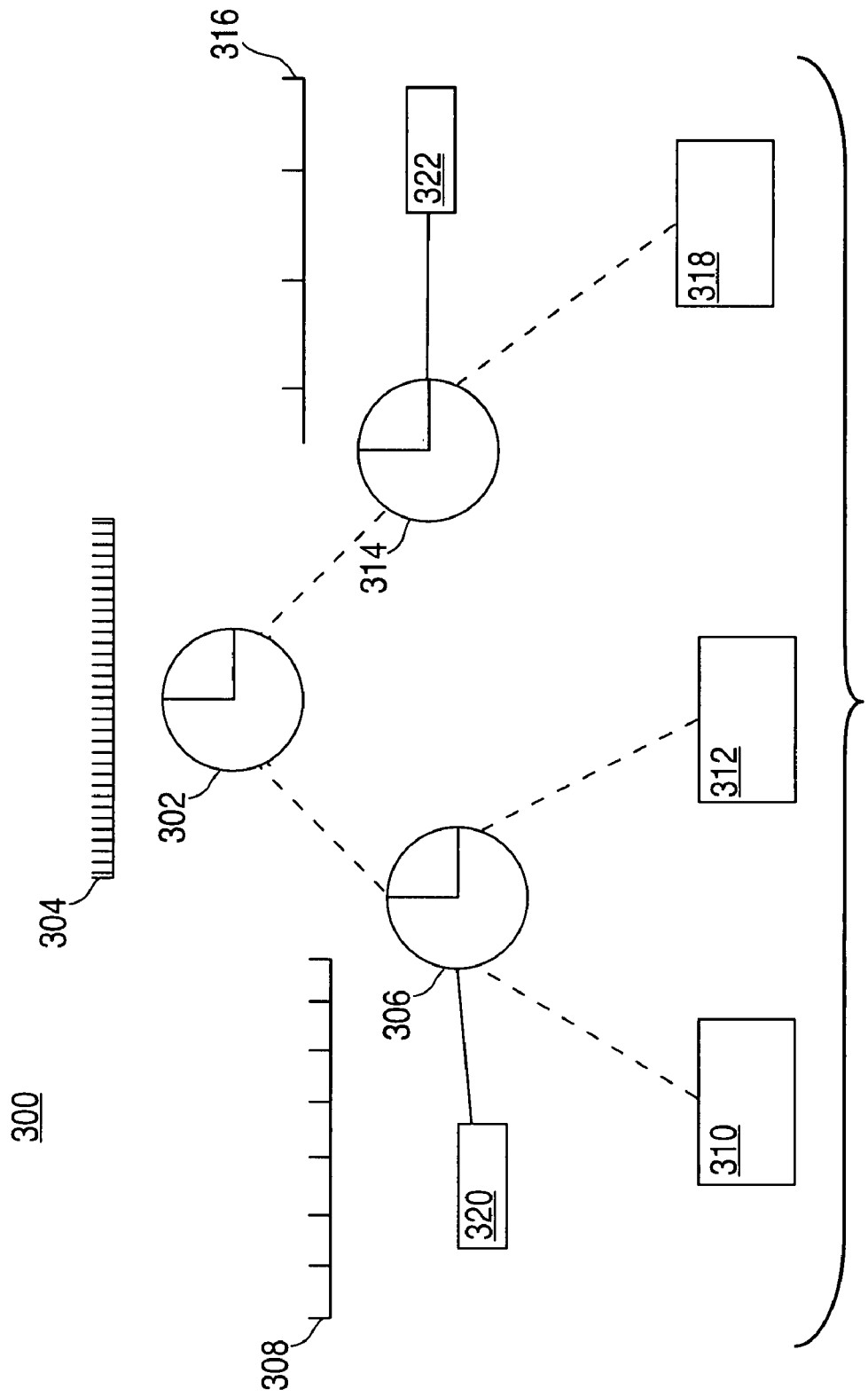
FIG. 3 is a block diagram illustrating an example embodiment using a common reference clock to relate disparate time clocks and their dependent time bases.

FIG. 3 is a block diagram 300 illustrating an example embodiment using a common reference clock 302 to synchronize multiple time-based data streams with independent clocks. For purposes of this example, the time clocks are an audio clock 306 and a video clock 314 along with their dependent time bases, but it should be understood that any number of clocks may be rooted in the common reference clock and that the example of a video clock and audio clock is for illustrative purposes only and should not be considered as a limitation upon any embodiment of the invention. In FIG. 3, there exists a common reference clock 302 to which all other clocks 306, 314 have a relationship. According to an embodiment, this relationship allows the calculation of an acceptable approximation of a representation of the relation between disparate time bases, even though the time bases do not have the same clock as their origins. For example, a timestamp in one time base may be translated to a timestamp in another time base even though the time bases are not derived from the same clock or share a common source time base. As another example, a time duration in one time base may be translated to a time duration in another time base even though the time bases are not derived from the same clock or share a common source time base. According to an embodiment, the calculation of the relationship between the disparate time bases allows for synchronization of multiple time-based data streams with independent clocks.

According to an embodiment, the common reference clock 302 is the CPU clock, although alternate embodiments exist wherein the common reference clock 302 is not the CPU clock, or may be any external time measurement to which the audio and video clocks 306, 314 have communicative access, such as an audio clock or a network clock. According to an embodiment, the audio clock 306 or video clock 314 may serve as the common reference clock 302.

In FIG. 3, the common reference clock 302 runs at a constant rate 304, which in this example is different from the audio clock rate 308 and the video clock rate 316. In alternate embodiments, the clocks may run at the same rate, or may run at rates that change independently over time. There are two time bases 310, 312 based upon the audio clock 306 and one time base 318 based upon the video clock 314. For example, the time bases 310 and 312 could control two audio tracks which must be mixed and then played in sync with the video track. The audio clock 306 and the video clock 314 run at different rates 308, 316.

According to an embodiment, each clock that is rooted in a common reference clock 302 has associated with it data that defines its rate scaler 320, 322 relative to the clock's immediately superior clock, which in this example is the common reference clock 302. As an example, if there were four clocks in the tree of clocks, each above the other, the rate scaler data for each clock would define the clock's rate scaler relative to the clock immediately above the clock at issue. The rate scaler is the ratio of the clocks' rates of advancement and in an embodiment is calculated based on timestamp data. If two clocks are in sync, the rate scaler between them is 1.0. If audio clock 306 is running 5% faster than the common reference clock 302, the rate scaler between them will be 1.05. According to an embodiment, the rate scaler is calculated by evaluating at least two sets of timestamp data and determining the difference between the timestamps. For example, a timestamp data T1 may be received from the common reference clock 302 and the audio clock 306 at the same point and timestamp data T2 may be received from the common reference clock 302 and the audio clock 306 at the same point but later than T1. According to an embodiment, the rate scaler associated with the audio clock 320 may be calculated by the formula (audio clock T2−audio clock T1)/(common reference clock T2−common reference clock T1), although other approaches of calculation are envisioned. According to an embodiment, rate scalers change over time, so they may be measured periodically.

According to an embodiment, the common reference clock 302 and time scaler data 320, 322 provide a reference point that clock to clock conversions may pivot through, if viewed as a graph. According to an embodiment, the time scaler data 320, 322 is not stored, but is determined at a particular point in time; for example, when a time base based in one clock needs to be related to a time base based in another clock. By determining a clock's current rate scaler to the common reference clock, an algebraic transformation may be utilized to determine the relationships between two points on disparate time bases rooted in disparate clocks. For example, a time (represented by a time stamp) in one time base may be translated into a time in another time base where the time bases are rooted in separate clocks, thereby allowing for the synchronization of data in the time-based data stream, such as video or audio. In another example, a time duration, which could be a time stamp or determined by evaluating time stamp data, in one time base may be translated into a time duration in another time base where the time bases are rooted in separate clocks, thereby allowing for the synchronization of data in the time-based data stream, such as video or audio.

For example, for a specific frame of video (determined by evaluating time base 318), the specific portion of audio content (determined by evaluating time base 310) that relates to the frame may be derived algebraically by relating times in disparate time bases. As discussed before, the concept of time in the video and audio time bases is defined relative to their respective clocks 306 and 314. In the examples given, times are represented by time stamp data and operations are performed on the time stamp data, although alternate measures of time are envisioned.

According to an embodiment, a specific time in the video content (perhaps associated with a specific frame) may be determined by subtracting an anchor time stamp, taken or received from the video clock at the same time an anchor time stamp is taken or received from the video time base, from the video clock's current time. This result is multiplied by the rate at which the video is playing and the product is added to the anchor time stamp taken or received from the video time base at the same time the anchor time stamp was taken or received from the video clock.

$$t\_video=((t\_clock314-anchor\_clock314\_video)*rate\_video)+anchor\_video$$

According to an embodiment, a specific time in the audio content may be evaluated in a similar manner by the example equation:

$$t\_audio=((t\_clock306-anchor\_clock306\_audio)*rate\_audio)+anchor\_audio$$

The times of clocks are not algebraically related, but current values of the relative rate scalers 320 and 322 are known. In an embodiment, current times of the clocks are measured at the same time to provide the simultaneous clock-to-clock anchors anchor_clock302 (the current time of the common reference clock), anchor_clock306 (the current time of the audio clock) and anchor_clock314 (the current time of the video clock). According to an embodiment, this measurement is provided by analyzing time stamp data.

According to an embodiment, the approach allows the derivation of an approximate relationship between a near-future or near-past group of simultaneous clock times, in this example labeled: t_clock302, t_clock306 and t_clock314. First, a time in the audio clock 306 may be derived based on the common reference clock 302.

$$t\_clock306=((t\_clock302-anchor\_clock302)*rate\_scaler\_320+anchor\_clock306$$

Next, a time in the video clock 314 may be derived based on the common reference clock 302.

$$t\_clock314=((t\_clock302-anchor\_clock302)*rate\_scaler\_322+anchor\_clock314$$

According to an embodiment, rate scalers must always be nonzero since clocks always move, which allows the following modification of the equation.

$$t\_clock302=((t\_clock314-anchor\_clock314)/rate\_scaler\_322+anchor\_clock302$$

Substitution of variables provides the following:

$$t\_clock306=((((t\_clock314-anchor\_clock314)/rate\_scaler\_322+anchor\_clock302)-anchor\_clock302)*rate\_scaler\_320+anchor\_clock306$$

Simplification of the equation provides:

$$t\_clock306=(((t\_clock314-anchor\_clock314)/rate\_scaler\_322)*rate\_scaler\_320+anchor\_clock306$$

Provided that rate_video is nonzero, the video equation may be rewritten:

$$t\_clock314=((t\_video-anchor\_video)/rate\_video)+anchor\_clock314\_video$$

Substitution of variables provides the following:

$$t\_audio=(((((t\_video-anchor\_video)/rate\_video)+anchor\_clock314\_video-anchor\_clock314)/rate\_scaler\_322)*rate\_scaler\_320+anchor\_clock306-anchor\_clock306\_audio)*rate\_audio)+anchor\_audio$$

The above approach is an example embodiment that allows for a relationship between a first set of time-based data (the audio time base) and a second set of time based data (the video time base) based on separate timing devices (the audio clock and the video clock) to be determined based on the relationship between the clock rate of the common reference clock and each of the audio clock and the video clock. For example, a time stamp in the video time base may be translated to a time stamp in the audio time base even though the video and audio time bases are rooted in separate clocks. As another example, a time duration in the video time base may be translated to a time duration in the audio time base even though the video and audio time bases are rooted in separate clocks. This allows synchronization of the time-based data and allows for getting from a point or points in one time base to a point or points in another time base.

In another example, the approaches described herein may be used to identify a point within a first time-based data stream, such as a video, that is associated with a time value generated based on a first timing device, such as a specific frame of the video associated with a specific time in the video stream time base that is rooted in a clock. Given this point, a corresponding point in a second time-based data stream, such as another video or an audio stream, that is associated with a time value generated based on a second timing device, such as a specific frame of another video associated with a specific time in the second video stream's time base that is rooted in a separate clock, may be determined. In one example, this may be determined based on analyzing the difference between the clock rate of the first timing device and a third timing device, and analyzing the difference between the clock rate of the second timing device and a third timing device.

In another example, the approaches described herein may be used to drive consumption of a first set of video frames based on a first rate associated with the video frames and a first set of anchor time stamp pairs as described herein. In this example, neither the rate nor the anchor time stamp pairs are associated with any particular time base. Along with the first set, consumption of a second set of video frames based on a first rate associated with the video frames and a first set of anchor time stamp pairs as described herein may be utilized, and a relationship determined between the first set of video frames and the second set of video frames based on the difference between the clock rate of the timing device associated with the first set of anchor time stamp pairs and the clock rate of a third device, and the clock rate of the timing device associated with the second set of anchor time stamp pairs and the clock rate of a third device.

According to an embodiment, the instantaneous relative rate between time bases, in this example the audio time base 310 and the video time base 318, may be calculated as the derivative with respect to t_video, of the following equation:

$$t\_audio=(((((t\_video-anchor\_video/rate\_video)+anchor\_clock314\_video-anchor\_clock314)/rate\_scaler\_322)*rate\_scaler\_320+anchor\_clock306-anchor\_clock306\_audio)*rate\_audio)+anchor\_audio$$

namely:

$$rate\_audio\_video=(((1/rate\_video)/rate\_scaler\_322)*rate\_scaler\_320)*rate\_audio$$

Which may be expressed as:

$$rate\_audio\_video=(rate\_audio*rate\_scaler\_320)/rate\_scaler\_322*rate\_video)$$

According to an embodiment, the relative rate may be used to resample audio to keep it in sync with the video. For example, if the time bases 310, 312, 318 are all running at rate 1, the audio clock 306 is running 0.1% faster than the common reference clock 302 (i.e., rate_scaler_320 is 1.001) and the video clock 314 is running 0.1% slower than the common reference clock 302 (i.e., rate_scaler_322 is 0.999), then audio must be played 1.002 times slower than normal (1.001/0.999). 48 kHz audio would need to be resampled to 48096 Hz, to extend the duration by 0.2%.

According to an embodiment, calculations are performed instantaneously and the measurements and adjustments are repeated periodically to obtain the most current values. According to an embodiment, the approaches described herein may be used to allow a clock, such as the video clock described earlier, to automatically determine what time it should be or receive input indicating the appropriate time. According to an embodiment, the approaches described herein are not limited to a specific number of clocks, as any number of clocks may be based on a common reference clock. Further, any number of clocks may be based upon a hierarchy of clocks based on a common reference clock.

Synchronizing Times with Common Reference Clock

Figure 4:
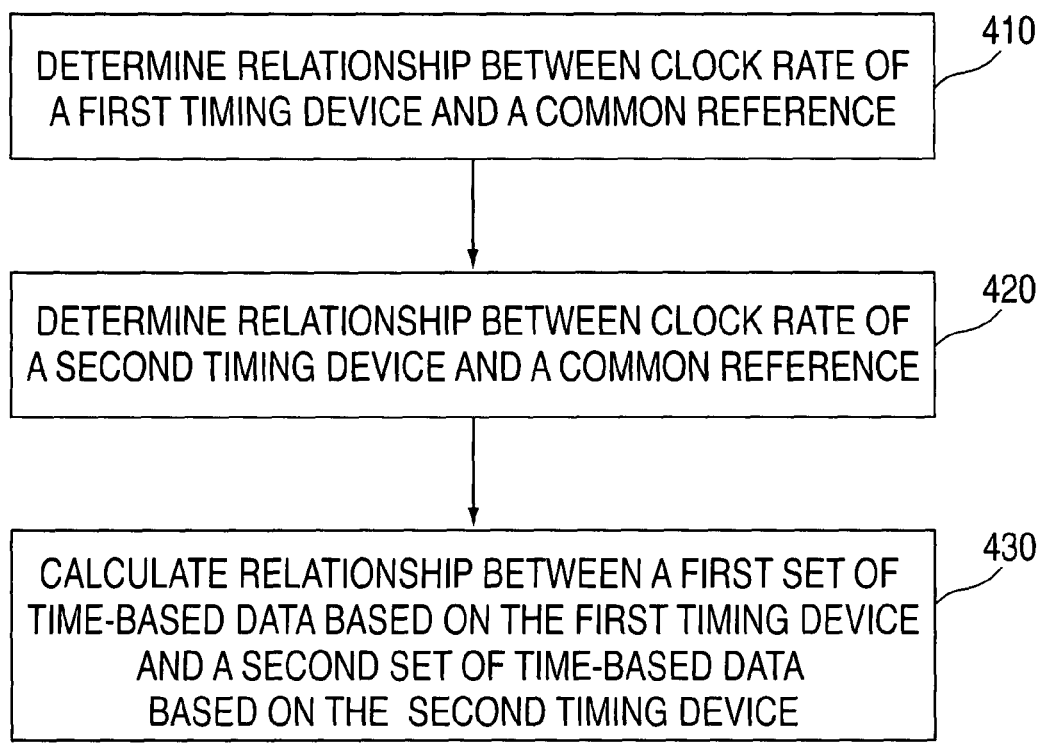
FIG. 4 is a flowchart illustrating the functional steps of synchronizing times with a common reference clock according to an embodiment of the invention.

FIG. 4 is a flowchart illustrating the functional steps of synchronizing times with a derived common reference clock according to an embodiment of the invention. The particular sequence of steps illustrated in FIG. 4 is merely illustrative for purposes of providing a clear explanation. Other embodiments of the invention may perform various steps of FIG. 4 in parallel or in a different order than that depicted in FIG. 4.

In step 410, a relationship between a clock rate of a first timing device, such as a video clock, and a common reference, such as a CPU clock or network clock, is determined. According to an embodiment, this relationship is the rate scaler between the first timing device and the common reference. According to an embodiment, the rate scalers between a common reference clock and any number of other clocks may be determined. According to an embodiment, this determination is made on a periodic basis. Because of the property of clocks to drift, the more often the determination is made, the more accurate the time synchronization and translations may be.

In step 420, a relationship between a clock rate of a second timing device, such as an audio clock, and the same common reference used in step 410, such as a CPU clock or network clock, is determined.

In step 430 a third relationship is calculated between a first set of time-based data that is based on the first timing device, such as a video stream with a time base rooted in the video clock, and a second set of time-based data that is based on the second timing device, such as an audio stream with a time base rooted in the audio clock. According to an embodiment, the rate scalers determined in steps 410 and 420 are used to translate times from a time base in the first set of time-based data to a time base in the second set of time-based data. According to an embodiment, this may be performed upon request or automatically.

Implementing Mechanisms

Figure 5:
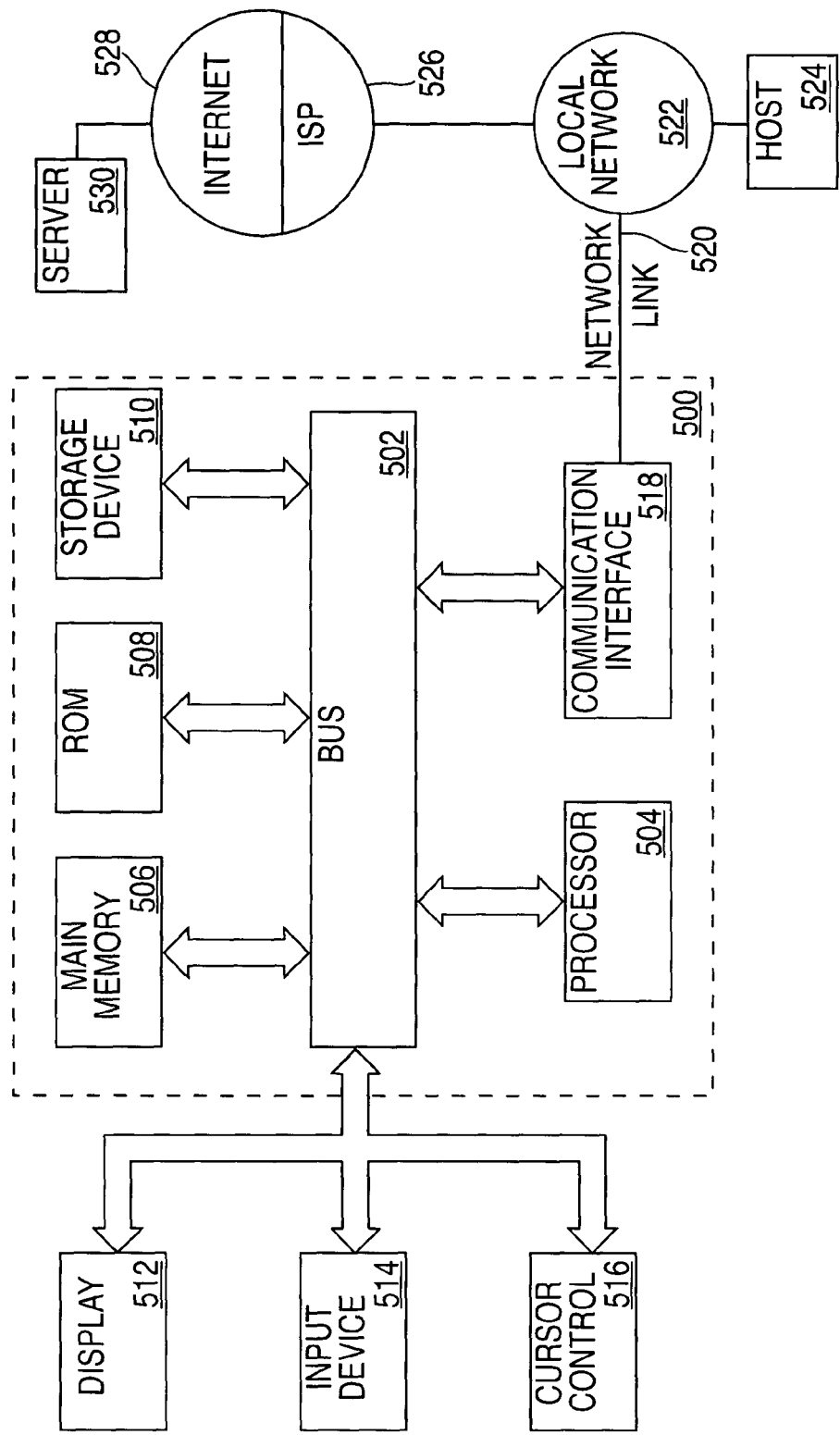
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

Synchronization Messages Between Processes

In certain embodiments, aspects of the invention are implemented in a media device configured to present media content, such as audio and/or video content, to a user. A media device may include a wireless communications device such as a cellular telephone, satellite telephone, cordless telephone, personal digital assistant (PDA), pager, portable computer, or any other device capable of wireless, Internet, packet, and/or switched communications A media device may also be integrated within the packaging of other devices or structures such a vehicle, video game system, appliance, clothing, helmet, glasses, wearable apparel, stereo system, entertainment system, or other portable devices. Alternative types of media devices may include, for example, a media player such as an IPOD or IPHONE available from APPLE Inc., of Cupertino, Calif., pocket-sized personal computers such as an IPAQ POCKET PC available by HEWLETT PACKARD Inc., of Palo Alto, Calif. and any other device capable of communicating wirelessly or via wireline.

In other embodiments, aspects of the invention are implemented on a media processing system that may include multiple media devices configured to communicate with each other via a communications network to facilitate the delivery of media content to a user. For example, the media system may include, without limitation, a computer system, distributed computer system, media system, entertainment system, audio or video editing or processing system, and the like. A media device may also include a media processing system.

Figure 6:
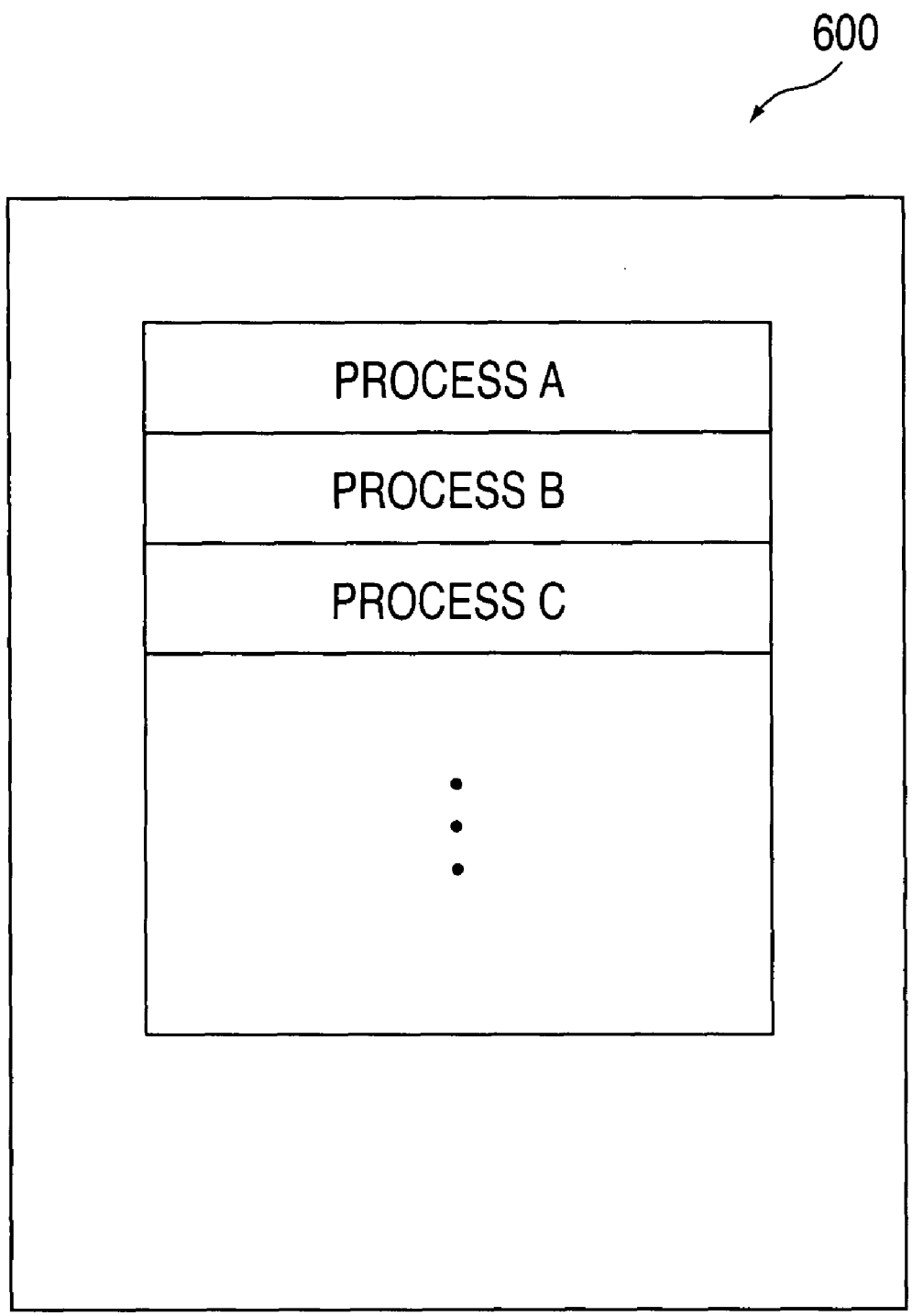
FIG. 6 is a conceptual diagram of the a operating system environment including multiple processes according to an illustrative embodiment of the invention.

FIG. 6 is a conceptual diagram of a operating system environment 600 including multiple processes according to an illustrative embodiment of the invention. The environment 600 may support the operation of numerous processes such as process A, process B, process C, and other processes. The processes A, B, and C may be based on one or more software applications or executable codes within a memory such as, for example, memory 506 of FIG. 5. The processor 504 may operate on one or more applications to run the processes A, B, and C. By way of example, process A may be a media playback process within a media device. Process B may be a user interface process within the media device that enables a user to control the display of a movie being played by the media playback process. Process C may include a Core Animation Render server that controls some or all display and interface information on a media device display including a media playback window and/or the user interface window.

Figure 7:
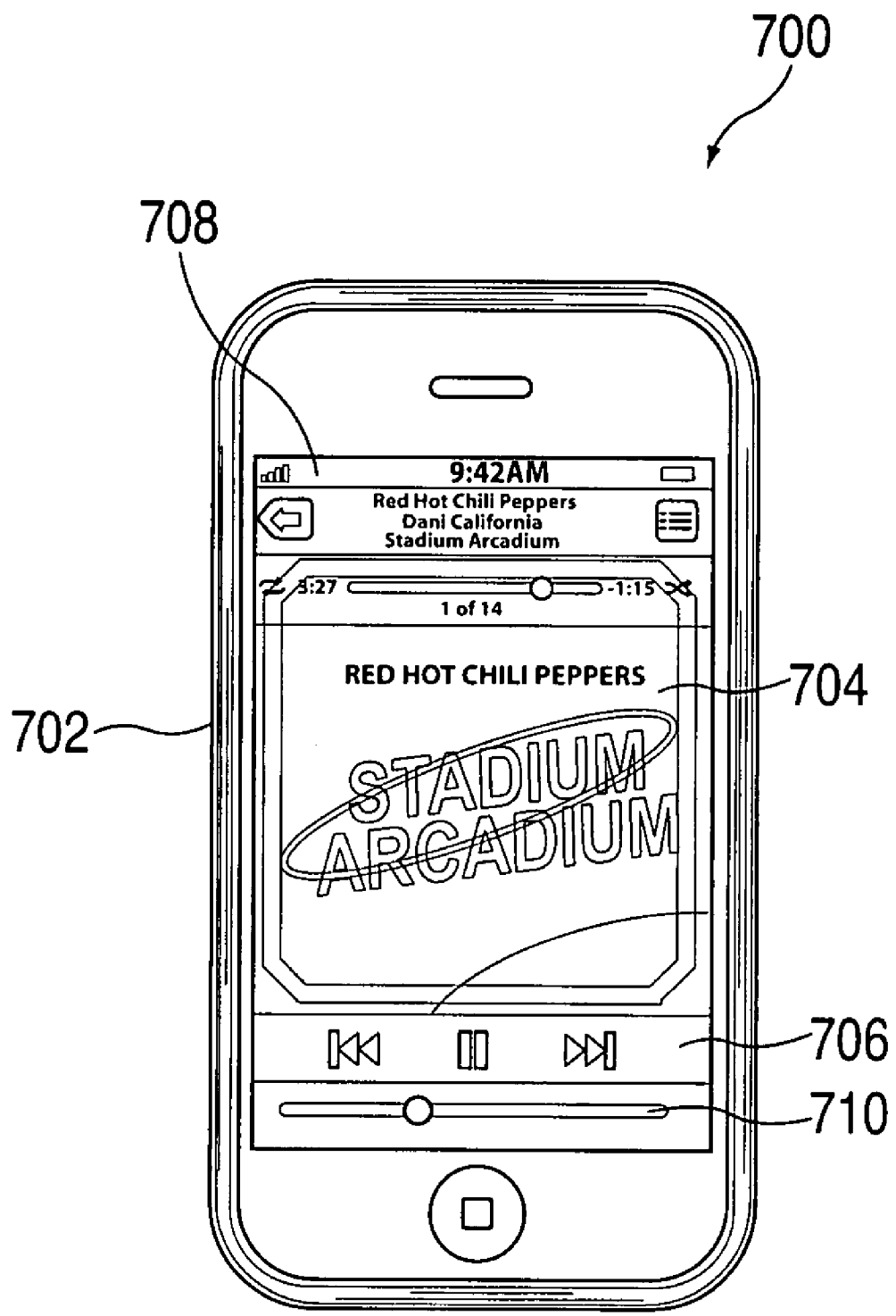
FIG. 7 is a screen shot of a media device display including a movie playback process and a user interface process according to an illustrative embodiment of the invention.

FIG. 7 is a screen shot 700 of a media device 702 display running a movie playback process and a user interface process according to an illustrative embodiment of the invention. In certain embodiments, the movie playback process facilitates a movie display 704, which may be, for example, a music video, a movie, video clip, or like video images. In one embodiment, the UI process facilitates a UI display and interface 706 that enables the media device user to play, pause, fast forward, reverse, or monitor, via a slider 710, the progress of the video displayed in movie display 704. Another process, e.g., a Core Animation process, may control the display of all border information 708 around the movie display 704.

Figure 8:
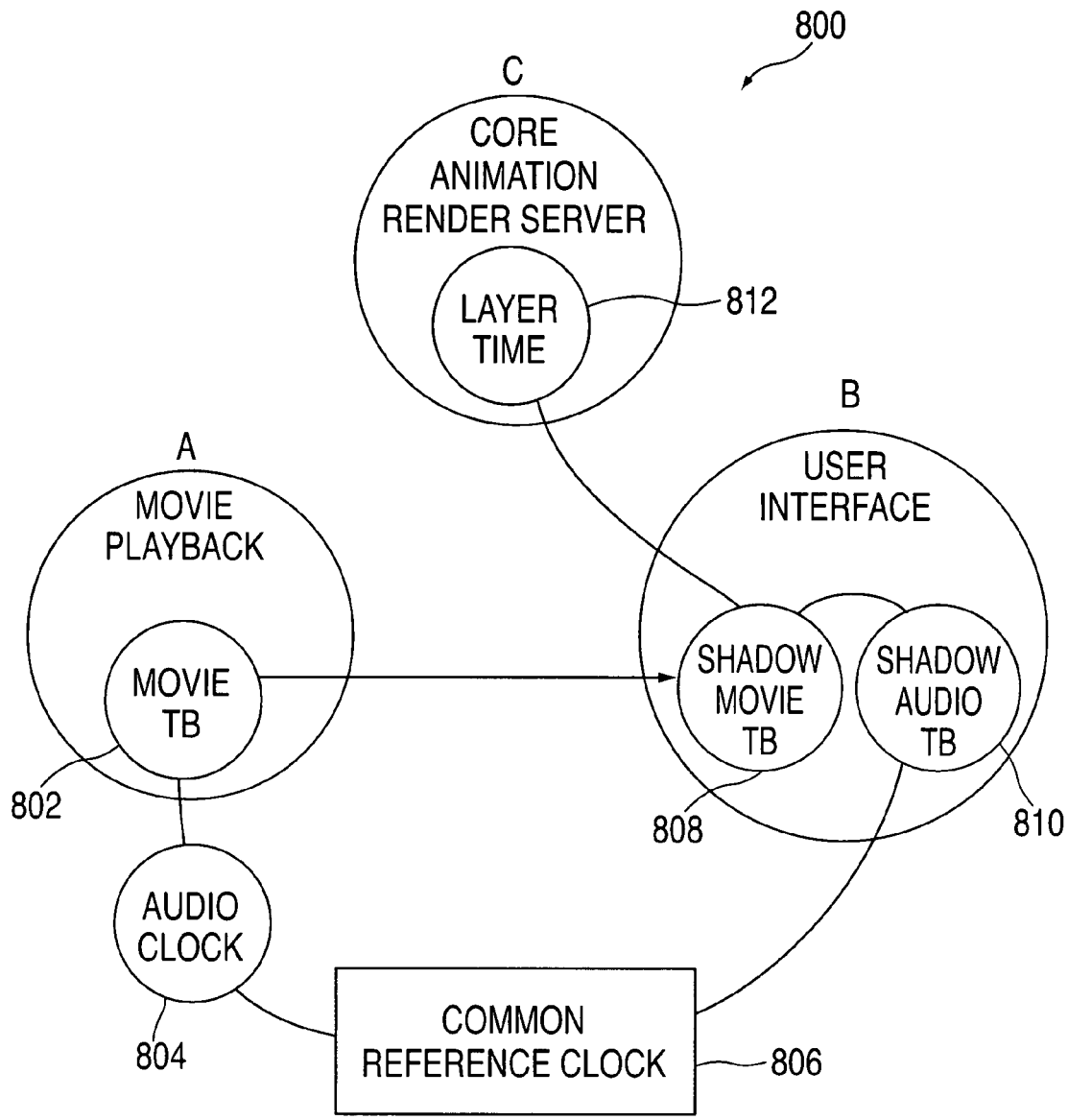
FIG. 8 is a conceptual diagram of a media processing system support time synchronization between time-based processes A, B, and C according to an illustrative embodiment of the invention.

FIG. 8 is a conceptual diagram of a media processing system 800 supporting time synchronization between time-based processes A, B, and C according to an illustrative embodiment of the invention. The media processing system 800 may include a movie playback process A having a movie time base 802. The movie time base 802 may be derived from a base clock such as, for example, audio clock 804. The media processing system 800 may support other base clocks such as, for example, a common reference 806. The common reference 806 may be used by a processor, e.g., processor 504, to facilitate processing operations and, for example, software or code executions in the operating system environment 600 of FIG. 6. The UI process B may include a shadow movie time base 808 and a shadow audio time base 810. The UI process B may interface with the Core Animation process C. The Core Animation process C may include a virtual render server and layer time 812. Periodically, intermittently, or in response to an event, process A may send timing information via link 814 to process B to enable process B to remain in proper synchronization with process A.

In the illustrative embodiment, process A includes a movie playback process. Process B includes a UI process that may include the display of slider 710. Process C includes a Core Animation Render Server. As discussed previously, a media processing system that supports the display of video typically supports associated audio. Thus, a media processing system, e.g., system 800, includes processes that enable the video and audio to remain in synchronization with each other. Because audio timing may be based on a timing source such as the audio clock 804 while the video timing may be based on another timing source, the system 800 includes mechanisms and/or processes that establish and maintain a synchronous relationship between the audio and video timing. The synchronization of audio and video may be controlled by the movie playback process A.

There are instances where a user may want to control the display of the movie being played by the media playback process A. Thus, a second process, e.g., UI process B, may support user control over the display of the movie being played by the media playback process A. For example, as shown in FIG. 7, the UI process B may enable a user to control the start, stop, rate forward, or rate backwards of the movie. However, it may be inefficient, undesirable, or not possible for the UI process B to have access to the base clock, e.g., audio clock 804, used by process A to maintain proper synchronization and timing with the media playback process A. It may also be undesirable to have UI process B continuously request and/or receive timing information, e.g., anchor moments with time stamps and/or rate data, from process A because the continuous processing of update messages from process A to process B may adversely load down the processor, e.g., processor 504 of FIG. 5, running processes A and B or other processes.

Advantageously, in one embodiment, the media system 800 minimizes communications between process A and process B by having process B maintain a shadow movie time base 808 and shadow audio time base 810. Instead of continuously sending update messages from process A to process B, process A may periodically send a timing synchronization message via link 814 to process B. Based on the timing information within the timing synchronization message, process B maintains the shadow time bases 808 and 810 which enables process B to accurately estimate the movie time base 802 and audio clock 804 of process A without the need for continuous and costly messaging.

Process A may send the timing synchronization message periodically, intermittently, or in response to an event. The period between sending timing synchronization message may be at least about 50 msec, 100 msec, 500 msec, 1 sec, 10 sec, 30 sec, 1 minute, 2 minutes, 5 minutes, 10 minutes, or more. The event that triggers the sending of a timing synchronization message may be user initiated, processor initiated, or network initiated. The event may include the receipt of a media processing instruction. The media processing instruction may include an instruction such as play, pause, fast forward, reverse, and stop. The media processing instruction may be delivered to process A from process B, process C, or another process. For example, the media processing system 800 may reside within a media device, e.g., cellular telephone. When a call is received by the media device, process C may instruct process B to stop playback while another process initiates the playing of a ring tone to inform the user that an call is incoming. Process A may then send a timing synchronization message to process B to indicate when the movie playback is paused or stopped.

As discussed previously, the timing between timing sources typically varies even where timing sources are intended to operate at the same frequency. Thus, Process B, in certain embodiments, accounts for a drift between the shadow time bases 808, 810 and the movie time base 802 and/or audio clock 804. Because the UI process B does not have access to the audio clock 804, the UI process B, in one embodiment, tracks the drift between the common reference 806 and the audio clock 804. In one embodiment, the UI process B is able to track the drift time between the shadow time bases 808 and 810 and the movie time base 802 because the UI process B receives timing synchronization messages that include anchor moments having at least the a time stamp of the time of the common reference 806 and a time stamp of the time of the audio clock 804. In certain embodiments, the timing synchronization message includes at least one of a time stamp from the base clock of the timing source audio clock 804, a time stamp from the base clock of the timing source common reference 806, a time stamp from the movie time base 802, a rate associated with the time base 802, and a rate scaler between the first and second timing sources (e.g., audio clock 804 and common reference 806).

Figure 9:
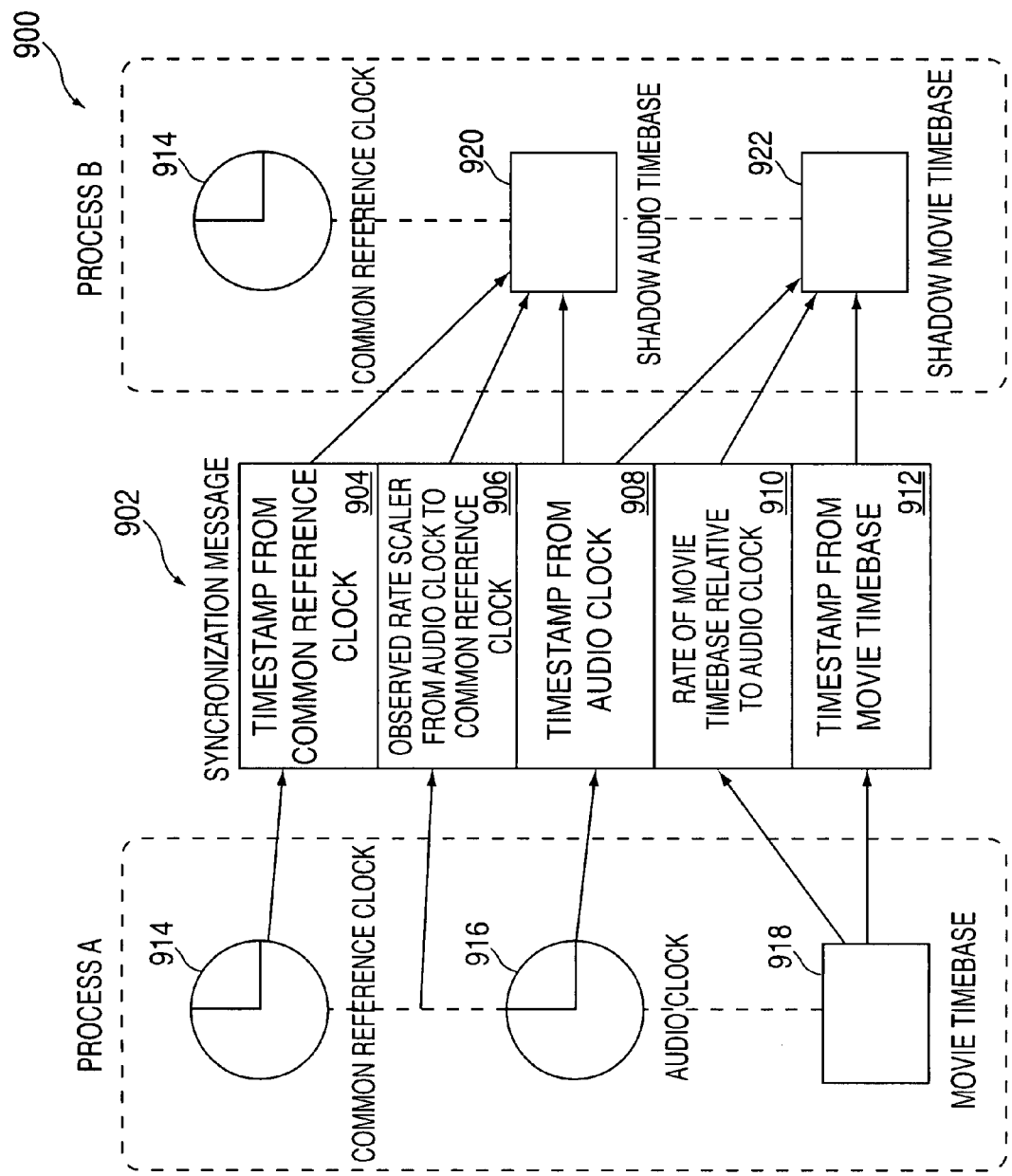
FIG. 9 is a conceptual diagram showing the content of a timing synchronization message and its relationship to a first process and a second process according to an illustrative embodiment of the invention.

FIG. 9 is a conceptual diagram 900 showing the content of a timing synchronization message 902 and its relationship to process A and process B according to an illustrative embodiment of the invention. In one embodiment, the timing synchronization message 902 comprises the following information from process A: the observed rate scaler from the audio clock to the common reference clock 906, the rate of the movie time base (relative to its time source, the audio clock) 910, and timestamps 904, 908, and 912, measured as near as possible to simultaneously from the common reference clock 914, the audio clock 916 and the movie time base 918.

Upon receipt of the synchronization message 902, process B updates the shadow audio time base 920 and shadow movie time base 922, setting each shadow time base's rate and anchor moment using the values in the message 902. The anchor source timestamp of the shadow audio time base 920 is set to the timestamp from the common reference clock 904. The rate of the shadow audio time base 920 is set to the observed rate scaler from the audio clock to the common reference clock 906. Also, the anchor base timestamp of shadow audio time base 920 is set to the timestamp from the audio clock 908.

The anchor source timestamp of the shadow movie time base 922 is set to the timestamp from the audio clock 908. The rate of shadow movie time base 922 is set to the rate of the movie time base relative to audio clock 910. The anchor base timestamp of the shadow movie time base 922 is set to the timestamp from the movie time base 912.

In one embodiment, the common reference clock 914 in process A and process B derive from a single hardware device. This approach eliminates the possibility of drift due to latency transmitting the synchronization message 902. When received, the synchronization message 902 describes the situation at a moment in time in the recent past, and provides all the necessary information to extrapolate forward to the current time.

Figure 10:
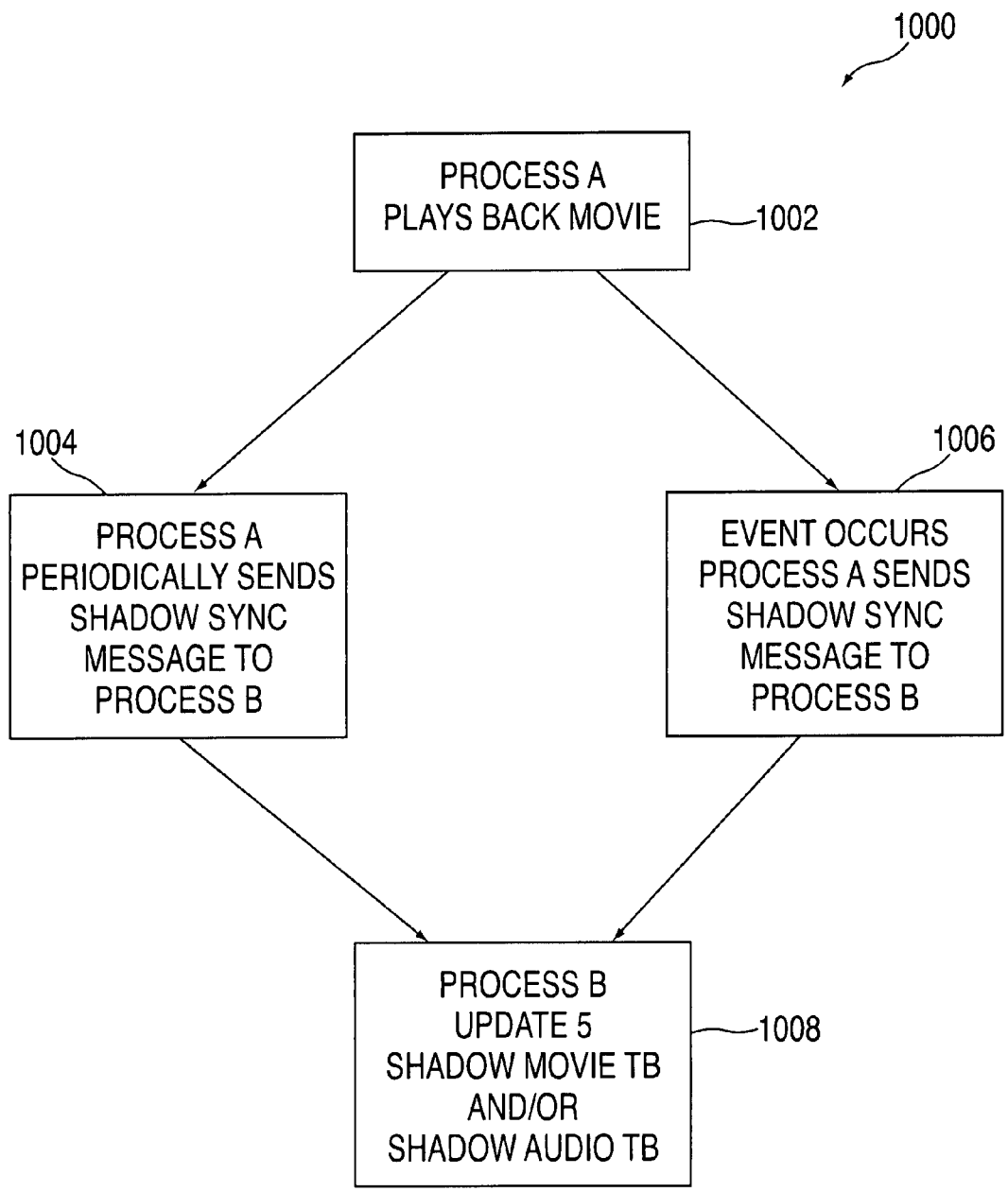
FIG. 10 is a flow chart showing the interaction between a first process and second process to enable the update of time synchronization information in the second process according to an illustrative embodiment of the invention.

FIG. 10 is a flow chart showing the interaction process 1000 between a first process (e.g., process A of FIG. 8) and second process (e.g., process B) to enable the update of time synchronization information in the second process according to an illustrative embodiment of the invention. First, process A plays back a movie (Step 1002). Process A may periodically send a shadow or timing synchronization messages to process B (Step 1004). Upon the occurrence of an event, process A may also send a shadow or timing synchronization message to process B (Step 1006). When a timing synchronization message is received, process B updates the shadow movie time base 808 and/or the shadow audio time base 810 (Step 1008).

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A media processing system comprising control circuitry configured to:
   execute a first process for processing media, wherein the first process accesses a first timing source and a second timing source, and wherein the first process processes media based at least in part on first timing information derived from the first timing source;
   execute a second process for processing the media, wherein the second process accesses the second timing source but cannot access the first timing source, and wherein the second process processes media based at least in part on shadow timing information;
   wherein the first process sends one or more timing synchronization messages, generated based at least in part on the first timing source and the second timing source, to the second process to synchronize the second process with the first process; and
   wherein the shadow timing information is an estimate of the first timing information maintained by the second process.

2. The system of claim 1, wherein each synchronization message is sent periodically.

3. The system of claim 1, wherein each synchronization message is sent in response to an event.

4. The system of claim 3, wherein the event includes the receipt, by the first process, of a media processing instruction.

5. The system of claim 4, wherein the media processing instruction includes at least one of play, pause, fast forward, reverse, and stop.

6. The system of claim 5, wherein the media processing instruction is delivered to the first process from a third process.

7. The system of claim 1, wherein the timing synchronization message includes at least one time stamp associated with the first timing information derived from the first timing source.

8. The system of claim 1, wherein the timing synchronization message includes at least one of a time stamp from a base clock of the first timing source, a time stamp from a base clock of the second timing source, a time stamp from a time base associated with the first process, a rate associated with the time base, and a rate scaler between the first and second timing sources.

9. The system of claim 1, wherein the shadow timing information is derived from the second timing source.

10. The system of claim 9, wherein the second timing source includes a common reference clock.

11. The system of claim 1, wherein the first timing information comprises at least one of a base clock of the first timing source and a first movie time base derived from the base clock of the first timing source.

12. The system of claim 11, wherein the shadow timing information comprises at least one of a first shadow time base estimating the base clock of the first timing source and a second shadow time base estimating the first movie time base.

13. The system of claim 12, wherein the first shadow time base and the second shadow time base continuously estimate the base clock of the first timing source and the first movie time base respectively.

14. The system of claim 1, wherein the first timing source includes an audio clock.

15. The system of claim 1, wherein the control circuitry is further configured to synchronize the second process with the first process by updating the shadow timing information based at least in part on the received synchronization messages.

16. A personal media device comprising a processor configured to:
   execute a first process for processing media, wherein the first process accesses a first timing source and a second timing source, and wherein the first process processes media based at least in part on first timing information derived from the first timing source;
   execute a second process for processing the media, wherein the second process accesses the second timing source but cannot access the first timing source, and wherein the second process processes media based at least in part on shadow timing information;
   wherein the first process sends one or more timing synchronization messages, generated based at least in part on the first timing source and the second timing source, to the second process to synchronize the second process with the first process; and
   wherein the shadow timing information is an estimate of the first timing information maintained by the second process.

17. The device of claim 16, wherein each synchronization message is sent periodically.

18. The device of claim 16, wherein each synchronization message is sent in response to an event.

19. The device of claim 18, wherein the event includes the receipt, by the first process, of a media processing instruction.

20. The device of claim 19, wherein the media processing instruction includes at least one of play, pause, fast forward, reverse, and stop.

21. The device of claim 20, wherein the media processing instruction is delivered to the first process from a third process.

22. The device of claim 16, wherein the timing synchronization message includes at least one time stamp associated with the first timing information derived from the first timing source.

23. The device of claim 16, wherein the timing synchronization message includes at least one of a time stamp from a base clock of the first timing source, a time stamp from a base clock of the second timing source, a time stamp from a time base associated with the first process, a rate associated with the time base, and a rate scaler between the first and second timing sources.

24. The device of claim 16, wherein the shadow timing information is derived from the second timing source.

25. The device of claim 24, wherein the second timing source includes a common reference clock.

26. The device of claim 16, wherein the first timing information comprises at least one of a base clock of the first timing source and a first movie time base derived from the base clock of the first timing source.

27. The device of claim 26, wherein the shadow timing information comprises at least one of a first shadow time base estimating the base clock of the first timing source and a second shadow time base estimating the first movie time base.

28. The device of claim 27, wherein the first shadow time base and the second shadow time base continuously estimate the base clock of the first timing source and the first movie time base respectively.

29. The device of claim 16, wherein the first timing source includes an audio clock.

30. The p device of claim 16, wherein the processor is further configured to synchronize the second process with the first process by updating the shadow timing information based at least in part on the received synchronization messages.

31. A method for processing media comprising:
  processing the media using a first process, wherein the first process accesses a first timing source and a second timing source, and wherein the first process processes media based at least in part on first timing information derived from the first timing source;
  processing the media using a second process, wherein the second process accesses the second timing source but cannot access the first timing source, and wherein the second process processes media based at least in part on shadow timing information;
  synchronizing the second process with the first process using one or more synchronization messages, generated based at least in part on the first timing source and the second timing source; and
  wherein the shadow timing information is an estimate of the first timing information maintained by the second process.

32. The method of claim 31 comprising sending each synchronization message periodically.

33. The method of claim 31 comprising sending each synchronization message in response to an event.

34. The method of claim 33, wherein the event includes receiving, by the first process, a media processing instruction.

35. The method of claim 34, wherein the media processing instruction includes at least one of play, pause, fast forward, reverse, and stop.

36. The method of claim 35 comprising delivering the media processing instruction to the first process from a third process.

37. The method of claim 31, wherein the timing synchronization message includes at least one time stamp associated with the first timing information derived from the first timing source.

38. The method of claim 31, wherein the timing synchronization message includes at least one of time stamp from a base clock of the first timing source, a time stamp from a base clock of the second timing source, a time stamp from a time base associated with the first process, a rate associated with the time base, and a rate scaler between the first and second timing sources.

39. The method of claim 31, wherein the shadow timing information is derived from the second timing source.

40. The method of claim 39, wherein the second timing source includes a common reference clock.

41. The method of claim 31, wherein the first timing information comprises at least one of a base clock of the first timing source and a first movie time base derived from the base clock of the first timing source.

42. The method of claim 41, wherein the shadow timing information comprises at least one of a first shadow time base estimating the base clock of the first timing source and a second shadow time base estimating the first movie time base.

43. The method of claim 42, wherein the first shadow time base and the second shadow time base continuously estimate the base clock of the first timing source and the first movie time base respectively.

44. The method of claim 31, wherein the first timing source includes an audio clock.

45. The method of claim 31, further comprising synchronizing the second process with the first process by updating the shadow timing information based at least in part on the received synchronization messages.

46. A non-transitory computer readable medium having computer executable code embedded therein for processing media, the executable code performing the following functions:
  processing the media using a first process, wherein the first process accesses a first timing source and a second timing source, and wherein the first process processes media based at least in part on first timing information derived from the first timing source;
  processing the media using a second process, wherein the second process accesses the second timing source but cannot access the first timing source, and wherein the second process processes media based at least in part on shadow timing information;
  synchronizing the second process with the first process using one or more synchronization messages, generated based at least in part on the first timing source and the second timing source; and
  wherein the shadow timing information is an estimate of the first timing information maintained by the second process.

* * * * *